July 10, 1928.

E. M. LONG 1,676,566

LENS CUTTING MACHINE

Filed March 14, 1923

WITNESS
Harold L. King.

INVENTOR
E. M. Long
BY
Howard P. Denison
ATTORNEY

July 10, 1928.
E. M. LONG
LENS CUTTING MACHINE
Filed March 14, 1923 4 Sheets-Sheet 2
1,676,566
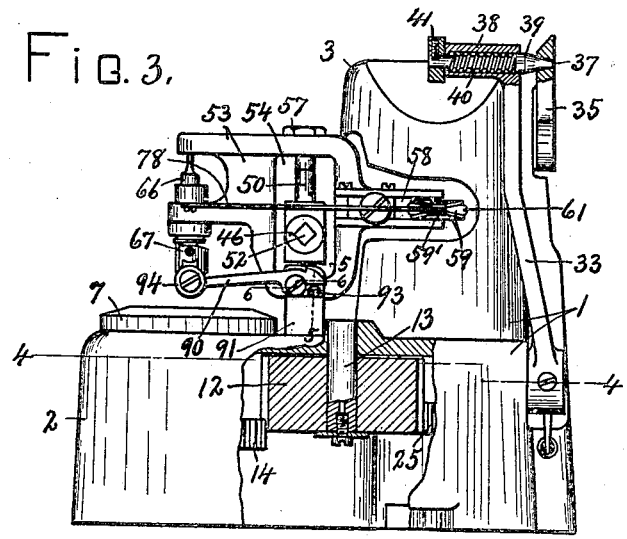
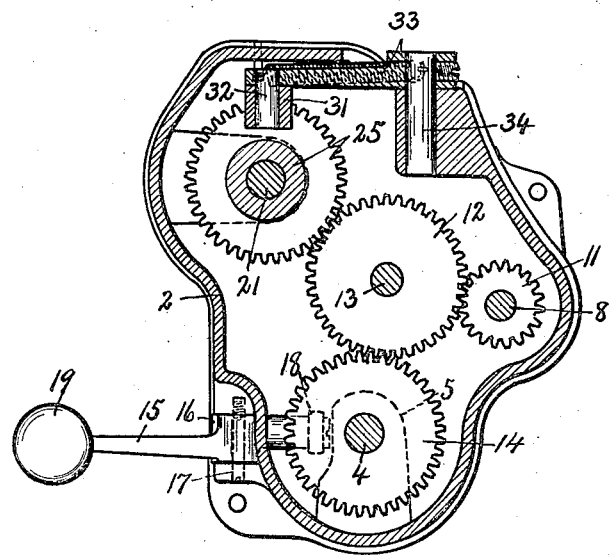

July 10, 1928.
E. M. LONG
1,676,566
LENS CUTTING MACHINE
Filed March 14, 1923
4 Sheets-Sheet 3
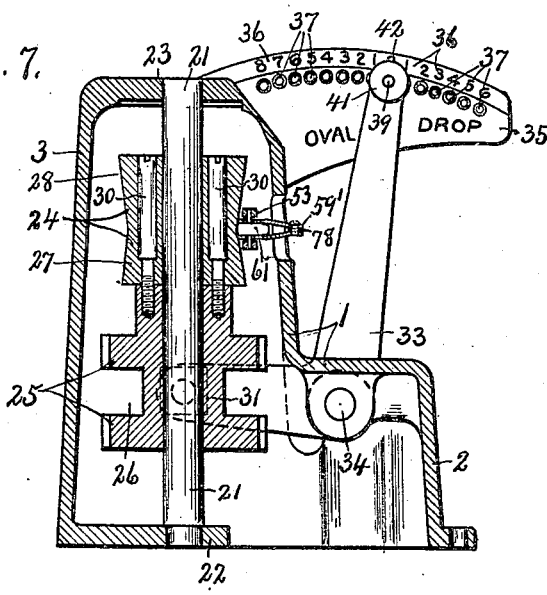
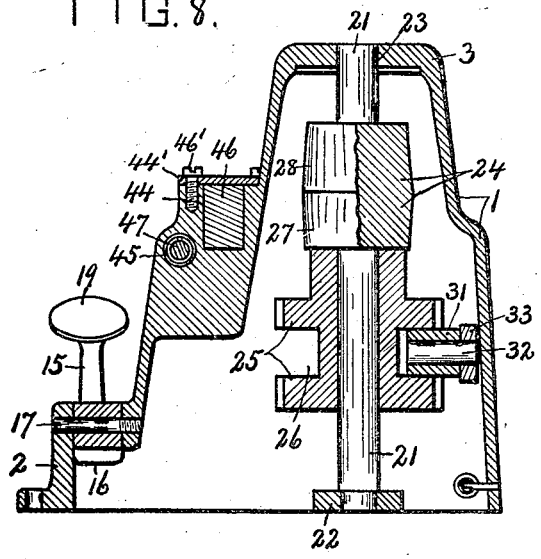
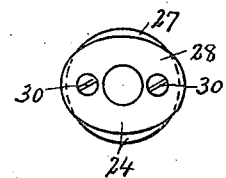
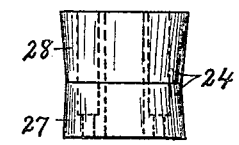
WITNESS
Harold L. King.
INVENTOR
E. M. Long
BY
Howard P. Denison
ATTORNEY.

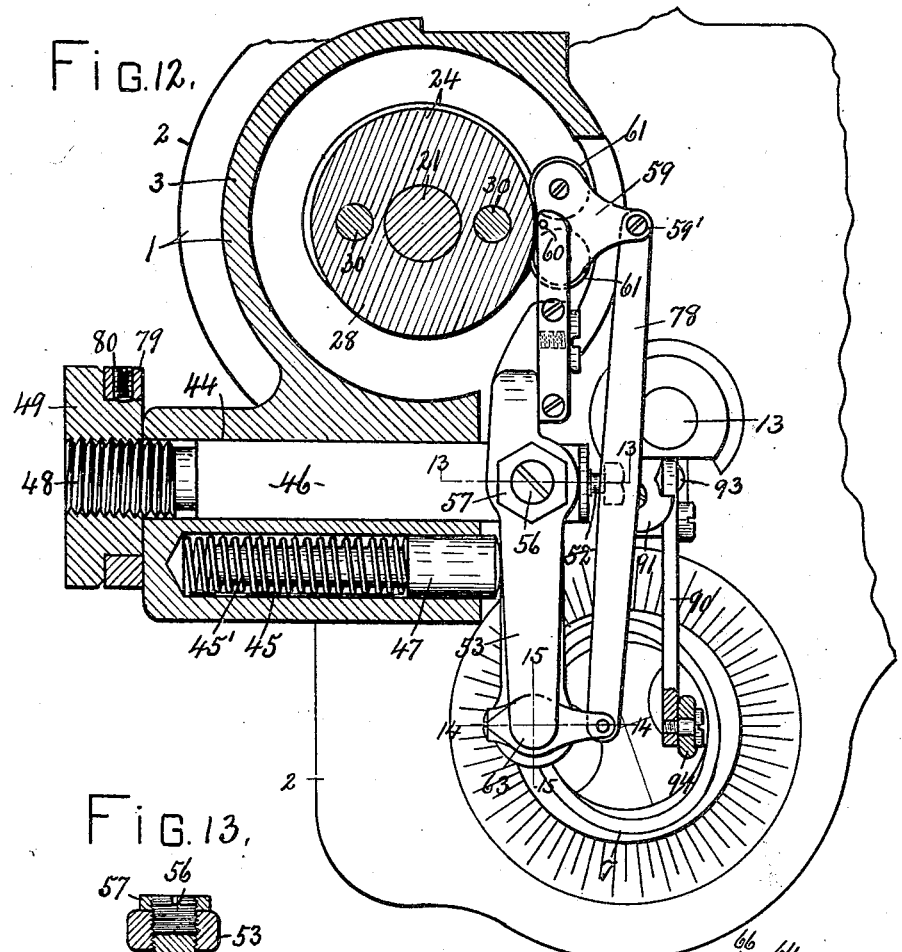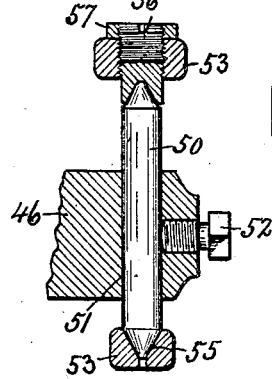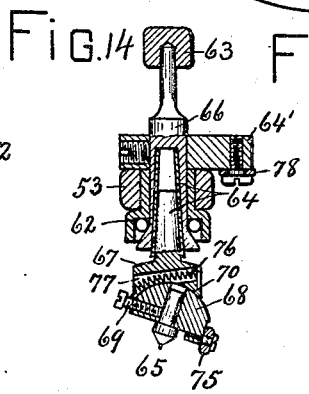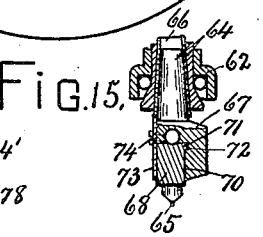

Patented July 10, 1928.

1,676,566

UNITED STATES PATENT OFFICE.

ELI MAYNARD LONG, OF GENEVA, NEW YORK, ASSIGNOR, BY MESNE ASSIGNMENTS, TO SHUR-ON STANDARD OPTICAL COMPANY, INC., OF GENEVA, NEW YORK, A CORPORATION OF NEW YORK.

LENS-CUTTING MACHINE.

Application filed March 14, 1923. Serial No. 624,935.

This invention relates to a machine for cutting lenses and analogous work in which the work is supported upon a suitable table and engaged by a cutting tool, the movements of which are controlled by a pattern member and the cutting is effected by the simultaneous rotation of the work holder and pattern.

The lenses to be cut vary materially in form or contour, and size, and one of the objects of my invention is to provide a pattern member or former with zones of different standardized contours adapted to cooperate with a suitable zone engaging member whereby the adjustment of one of said members lengthwise of the axis of rotation of the pattern member will cause the cutting of the lens to a form corresponding to that of the particular zone engaged by the zone engaging member or rider.

Another object is to merge the several zones in unbroken continuity so that the relative adjustment may be made without disengaging the members.

A further object is to provide a scale cooperating with the adjusting means to determine the exact position of any particular zone with reference to the zone engaging member and incidentally, to pre-determine the form of the lens to be cut.

A still further object is to provide means whereby the cutting tool may be automatically adjusted to conform to curves of different radii during the cutting operation so that the tool may always present its best cutting edge or point substantially tangential to the contour of different portions of the lens operated upon.

Another object is to provide convenient means for adjusting the tool holder for varying the diameter of the work.

Other objects and uses relating to specific parts of the machine will be brought out in the following description:

In the drawings—

Figure 3 is a side elevation, partly in section, of the same machine.

Figure 4 is a horizontal sectional view taken on line 4—4, Figure 3.

Figures 5 and 6 are enlarged detail sectional views taken respectively on lines 5—5 and 6—6, Figure 3.

Figure 1:
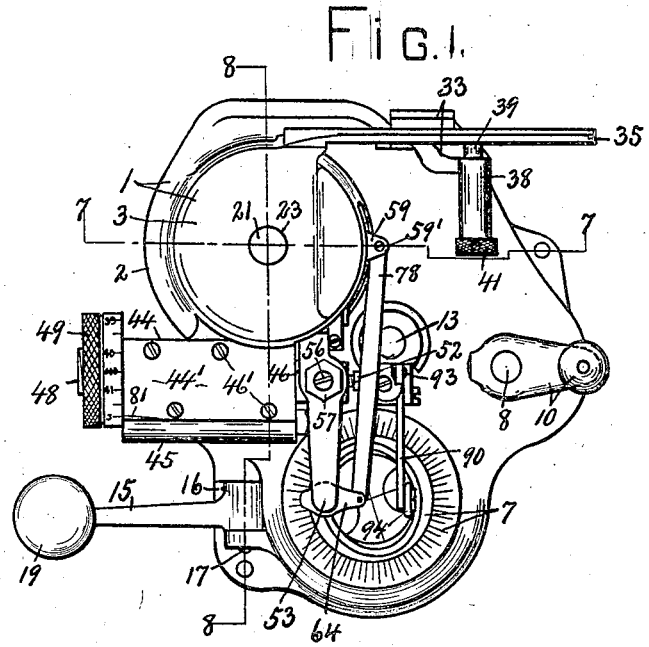
Figure 1 is a top plan of a lens cutting machine embodying the various features of my invention.

Figures 7 and 8 are vertical sectional views taken respectively on lines 7—7 and 8—8, Figure 1.

Figures 9, 10, and 11 are respectively a top plan, a side elevation and an inverted plan of the detached pattern member.

Figure 2:
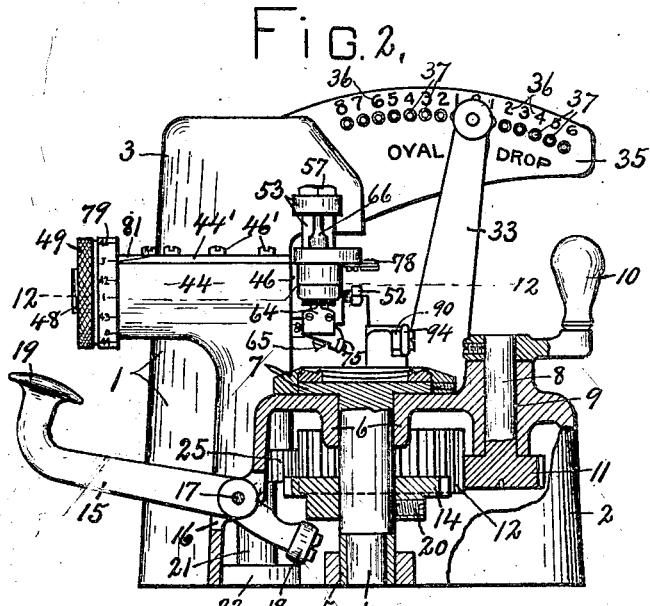
Figure 2 is a front elevation of the same machine partly in section to show the manner of mounting and adjusting the rotary work support.

Figure 12, is an enlarged horizontal sectional view approximately in the plane of line 12—12, Figure 2, except that the mechanism for transmitting motion from the pattern member to the cutting tool is shown in top plan and that a portion of the pressure device for pressing the lens against the work holder is shown in section.

Figures 13, 14 and 15 are detail sectional views taken respectively on lines 13—13, 14—14 and 15—15, Figure 12.

As illustrated, this machine comprises a main supporting frame —1— consisting of a hollow base —2— and hollow upright standard —3— rising therefrom and opening thereinto at the bottom for receiving and supporting the various cooperative mechanisms presently described.

Work support.

An upright shaft —4— is journaled in suitable bearings —5— and —6— in the base —2— and is provided at its upper end with a work supporting table —7— which, together with the shaft —4— is movable vertically toward and from the tool holder to press the work against the tool as may be required to cut the lens to the desired form while the work table with the work thereon is being rotated relatively to the tool.

The means for rotating the work support comprises an upright drive shaft —8— journaled in a suitable bearing —9— in the base —2— and having its upper end provided with a hand crank —10— and its lower end provided with a pinion —11— meshing with a relatively larger gear —12— which in turn is journaled upon an upright stud —13—, and engages a similar gear —14— on the shaft —4— for rotating said work holder.

The upright stud —13— is tightly fitted in a suitable opening in the upper wall of the base —2— and has its lower end provided with a suitable shoulder for holding the gear —12— against downward displacement.

The face width of the gear —12— is somewhat greater than that of the gear —14— meshing therewith to permit the gear —14— and its work supporting shaft —4— to be moved vertically in a manner presently described for pressing the work against the tool.

The means for effecting this vertical adjustment of the work holder consists of a hand lever —15— extending through an opening —16— in one side of the base —2— and fulcrumed or pivoted at —17— to said base to permit the lever to swing vertically, the inner end of said lever being extended under the lower end of the gear —14— and is provided with a roller —18— for engaging the under side of said gear while the outer end of the lever is provided with a hand piece —19— by which it may be depressed to raise the work holder toward the tool, said gear —14— being secured to the shaft —4— by a set screw —20— to impart rotary motion thereto as the gears revolve, it being understood, that the work holder, including the gear —14— will return to its normal position by its own weight when pressure upon the hand piece —19— is released, thereby restoring the lever to its normal position.

*A rotary former or pattern member.*

An additional upright shaft —21— is supported at its lower and upper ends in suitable bearings —22— and —23— in the main frame —1— for receiving and supporting a lens pattern or former —24— and a gear —25— secured together end to end co-axially to rotate together and to move axially along said shaft.

The lens pattern or former —24— is preferably composed of lower and upper sections —27— and —28— integrally or otherwise secured together end to end and the lower section secured to the upper end of the hub of the gear —25—, by bolts —30—. Figure 7.

The intermediate portion of the pattern —24— is circular and constitutes what may be termed a "circular zone," the remaining portions of the upper section —28— being elliptical and gradually merging in unbroken continuity with the circular zone while the remaining portions of the lower section are somewhat irregular or of the "drop eye" form, thereby constituting zones of different contours which merge with each other and with the intermediate circular zone in unbroken continuity to produce lenses of corresponding forms according to the position of the pattern as a whole relatively to the mechanism by which motion is transmitted from the former to the lens cutting tool as will be hereinafter more fully explained.

As shown in Figures 7 to 11 inclusive, the upper section —28— tapers from the circular zone towards the upper end at one diameter and flares laterally at another diameter at right angles to the first named diameter for the purpose of producing elliptical lenses of gradually varying diameters from the circular zone to the extreme elliptical zone at the upper end of the former.

The lower section —27— flares downwardly from the opposite ends of one diameter of the circular zone corresponding to the long diameter of the elliptical zones and tapers downwardly at one end of another diameter at right angles to the first named diameter thereby producing a series of zones of somewhat irregular contour which may be termed "drop" zones for producing what is commonly known as "drop" lenses as shown more clearly in Figure 11, in which one radius is shorter than the remaining radii.

The gear —25— meshes with and is rotated by the gear —12— and is provided with an annular groove —26— for receiving a shifting block —31— which is pivotally mounted upon a stud —32— on end end of a bell crank lever —33—, the latter being pivotally mounted at —34— on the base —2— and has its other arm extended upwardly through an opening in said frame and movable along a graduated bracket —35— for shifting the gear —25— and pattern member —24— vertically in opposite directions along the shaft —21—.

The bracket —35— is rigidly secured to the rear side of the upper portion of the column —3— and is provided with a row of graduations —36— and a corresponding row of apertures —37— both rows being concentric with the axis of the pivot —34— and along which the adjacent end of the lever is adapted to move.

The upper end of the lever —33— is provided with a hollow hub —38— for receiving a stop pin —39— which extends entirely through the hub —38— and has one end pointed and urged by a coil spring —40— into any one of the apertures —37— with which it may be registered, the other end of said stop pin being provided with a hand piece —41— by which it may be withdrawn from the apertures —37— against the action of the spring —40— when it is desired to shift the lever along the scale —36— or from one aperture to another, said lever —33— and scale —36— or apertures —37— constituting an indexing device for registering the various pattern zones with the contact member —59—.

These apertures are numbered consecutively in opposite directions from a zero point —42— along the scale —36— to indicate the different zones of the former —24—, the zero graduations indicating the circular zone while the graduations at the left of the zero point, Figure 7, indicate the various elliptical zones of the upper pattern section —28— and those at the right of the zero point indicate the different zones of the lower section —27— so that when the lever —33— is adjusted to register with the zero point —42—, the circular zone of the pattern member —24— will be registered with the tool operating means presently described, or when adjusted to register with any one of the apertures at the left of the zero position, will cause a corresponding elliptical part of the pattern member to be registered with said tool operating mechanism.

On the other hand, when shifted to register with any one of the apertures at the right of the zero position, will cause the corresponding portion of the lower section —27— of the pattern member, to register with the same actuating mechanism.

These various adjustments of the lever —33— and incidental axial adjustment of the pattern member, causes the lens on the revolving work table to be cut to a form corresponding to the particular zone of the pattern member which may be registered with the tool operating means.

*Tool operating means.*

The frame 1 is provided with parallel horizontal guideways —44— and —45— arranged side by side as shown in Figure 12, in a plane above the work support —7— and between said work support and the pattern member —24— at substantially right angles to the axis thereof for receiving a sliding carrier —46— and a plunger —47—.

The carrier —46— is movable endwise in the guideway —44— and extends beyond the opposite ends thereof, one end being provided with a reduced left hand thread —48— engaged by a hand nut —49— which also engages the outer end face of the guideway —44—.

A vertical spindle —50— is mounted for longitudinal adjustment in a guide opening in the opposite end of the carrier —46— and is held in its adjusted position by a set screw —52—, Figure 13.

The lower and upper ends of this spindle —50— are provided with tapered journals for receiving and supporting a lever —53— of the first kind.

That is, the lever —53— is provided with a central opening —54—, Figure 3, and the portion thereof at the lower side of the opening is provided with a tapered bearing —55— for receiving the adjacent end of the spindle —50— while the upper portion of the lever is provided with a screw bearing —56— for engaging the upper end of the spindle, said screw bearing being adjustable in a threaded opening in the upper part of the lever to take up wear and is held in its adjusted position by a lock nut —57—, Figure 13.

The vertical height of the opening —54— is somewhat greater than the corresponding height of the adjacent portion of the carrier —46— to enable the lever —53— and all parts carried thereby to be adjusted vertically relatively to the pattern member —24— and its supporting shaft —21— in order that the contact member carried by said lever may engage the periphery of the pattern member at a certain zone when the lever —33— is set to the graduation on the scale —36— corresponding to that zone, the lever and its supporting spindle —50— being held in their adjusted position by the set screw —52—, Figure 13.

The carrier —46— for the lever —53— is disposed approximately midway between the axes of the work holder —7— and pattern member —24— while the lever —53— extends in opposite directions from the spindle —50— substantially the same distances as the distance between said spindle and the axes of the work holder and pattern member which axes are disposed respectively at the front and at the rear of the corresponding ends of the lever so that the contact member on the lever engages the front face of the former while the opposite end of the lever carrying the tool traverses the face of the work holder at the rear side of the axes of the latter.

The end of the lever —53— adjacent the pattern member —24— is preferably bifurcated to form a lengthwise slot —58— for receiving a rider —59— which is pivoted at —60— to the opposite arms of the lever to swing about a vertical axis parallel with that of the spindle —50— and is provided with a pair of rollers —61— at opposite sides of its pivot —60— for engaging the periphery or perimeter of the pattern member —24— at different points about the axis thereof.

The opposite end of the lever —53— is also bifurcated and has its opposite arms provided with journaled bearings —62— and —63— for receiving and supporting a relatively rotatable tool holder —64— carrying a cutting tool as —65—, Figure 14.

The tool holder —64— preferably consists of an upper section —66— and a lower section —67— having a tapered stem which is tightly fitted in a corresponding socket in the lower end of the section —66— and supports an additional section —68— in which the tool —65— is secured by a set screw —69—.

The section —68— is mounted upon the lower end of the section —67— to turn about a horizontal axis and for this purpose is mounted in a recess —70— in one side of the section —67— and is provided with a circular rib —71— riding in a corresponding circular groove —72— in the back wall of the recess —70— where the member —68— is held against displacement by a plate —73—, the latter being secured to the section —67— by one or more screws —74—, Figure 15.

The front side of the section —68— is provided with a roller bearing —75— adapted to bear upon the work on the work table —7— when the cutter —65— is in operative engagement with said work.

The tool supporting section —68— is yieldingly held in a tilted position with its bearing roller —75— in substantially the horizontal plane of the cutter —65— by means of a light coil spring —76— which is passed through an opening —77— in the section —67— and has one end connected to the front side of the section —67— and the other end to the set screw —69—.

The object of this bearing roller —75— is to assist in pressing the work against the holder —7— and to protect the diamond cutting point at —65— against undue pressure upon said work.

It is now clear that the rider —59— and work holder —64— are both free to turn upon the corresponding ends of the lever —53— relatively thereto, and that the two point contact of the rider —59— against the elliptical or irregular zones of the pattern member —24— will produce a slight rocking movement of said rider about its pivot —60— as the rollers —61— engage points in said zones at different distances from the axis of the pattern member and in order that the cutter —65— may be kept in proper cutting relation to the work, it is desirable to transmit the independent rocking motion of the rider —59— to said cutter and for this purpose both the rider and the tool holder are provided with forward extensions —59'— and —64'— which are pivotally connected to each other by a link —78— shown in Figure 12, at the front side of the lever so as to move freely without friction therewith.

The plunger —47— is spring pressed endwise by a coil spring —45'— against a portion of the lever —53— between the tool supporting member —64— and spindle —50— and thereby, serves to yieldingly hold the rider —59— in contact with the periphery or perimeter of the pattern member —24— in all positions of adjustment of the latter as well as in all positions of adjustment of the carrier —46— and lever —53— carried thereby.

The guideway —44— for the carrier —46— is provided with a removable top or cap section —44'— (Figure 8) which is held in operative position by screws —46'— so that by removing the screws and cap the carrier —46— together with the lever —53—, and parts carried thereby may be removed and replaced as a unit.

The nut —49— serves as a means for adjusting the carrier —46— endwise and thereby moving the cutting tool to different distances from the axis of the tool holder for cutting lenses of different diameters while the rider —59— may be engaged with any one of the several zones of the pattern member, said nut being provided with a circumferentially graduated ring —79—, secured thereto by a set screw —80— and adapted to register with a fixed mark —81— (Figs. 1 and 2) on the adjacent end of the cap plate —44'— to indicate the different radii to which the lenses may be cut.

A pressure arm —90— is pivotally mounted upon a block —91— which in turn is secured to the upper side of the base —2— by means of a clamping screw —92—, (Figure 5 and 6), one end of the lever being spring pressed upwardly by a plunger —93— and a coil spring —93'— while the other end of the arm —90— is somewhat longer and spring pressed downwardly toward the work table —7— and is provided with a roller —94— adapted to engage the upper face of the work to hold the latter in place as the work table with the work thereon is rotated.

Operation.

The form of the lens to be cut is determined by adjusting the lever —33— into registration with a certain graduation or aperture on the scale —36—and then adjusting the carrier —46— by means of the screw —49— to the desired position for cutting the lens to the required diameter or radius whereupon the lens or other work to be cut is placed upon the work holder —7— and the latter raised by means of the lever —15— to engage the work with the pressure rollers —94— and —75— and the cutter —65— whereupon the work holder —7— and pattern member —24— may be simultaneously rotated by means of the hand crank —10— and gear train previously described.

For example, when the lever —33— is set to the zero position along the scale —36—, the pattern member —24— will be adjusted to a position which will register its circular zone with the rider —59— or by adjusting the lever —33— to the left of the zero position, will cause a corresponding downward movement of the pattern member —24— to register one or the other of the elliptical zones with said rider.

On the other hand, by adjusting the lever —33— to the right of the zero position, Figure 2, will cause a corresponding upward movement of the pattern member —24— to register one or the other of the "drop" zones of the lower section —27— with the rider —59—, it being understood that when the pattern member —24— is adjusted to register any one of its particular zones with the rider —59— and the work table and cutting tool are brought into cutting relation, and the work table with the work thereon and pattern member —24— are rotated by the means provided therefor, the lens will be cut to a form corresponding to that of the zone engaged by the rider —59—.

It will also be evident that any rocking motion imparted to the rider —59— relatively to the lever —53— by the engagement of said rider with portions of the zone of different radii, will cause a similar rocking movement of the tool holder to keep the tool in proper cutting position relatively to the work.

It is evident, however, that various changes may be made in the detail construction of the various parts of the machine without departing from the spirit of the invention and therefore, I do not wish to limit myself to the precise construction shown and described.

I claim:

1. In a lens-cutting machine, a rotary work-holder, a pattern rotatable about an axis parallel with the axis of the work-holder and provided with a plurality of zones arranged in sequence axially and having their surfaces gradually merging one with the other, means for rotating the work-holder and pattern in unison, a cutter movable relatively to the work holder, pattern-controlled means including a contact member for moving the cutter, and an indexing device operable at will for moving the pattern axially to register any one of its zones with the contact member.

2. In a lens cutting machine, a rotary work-holder, a rotary pattern, a lever supported between the work-holder and pattern, an oscillatory tool-holder pivoted on the lever and adapted to carry a tool to bear on work on the work-holder, an oscillatory rider also pivoted on the lever and having two points of contact with the pattern, and a link connected to said tool-holder and to said rider at one side of the axis of oscillation of each.

3. In a machine for cutting lenses and analogous work, a rotary work-holder, a tool-holder and means for moving the tool-holder transversely of the work-holder including a rotary pattern member having zones of different curvatures in different planes at right angles to its axis of rotation merging with unbroken continuity, a zone-engaging member, means for rotating the work-holder and pattern in unison, and an indexing device operable at will for moving one of said members axially to register any one of said zones with the zone-engaging member.

4. In a machine for cutting lenses and analogous work, a rotary work-holder, a tool-holder, a pattern member rotatable about an axis parallel with and some distance to one side of the axis of the work-holder and having zones of different curvatures arranged in sequence lengthwise of the axis of rotation of the pattern, and means actuated by said pattern member for moving the tool holder transversely of the axis of the work holder, said pattern member being adjustable axially to present different zones to the actuated means, the axis of the pattern being co-incident with the axis of rotation in all positions of adjustment.

5. In a lens-cutting machine, a rotary work-holder, a rotary pattern in offset relation to and with its axis parallel with that of the work-holder, means for rotating the work-holder and pattern in unison, a lever of the first kind, a contact member pivoted to one end of the lever and having two points of contact with the pattern at opposite sides of its pivot, a tool-holder pivoted to the other arm of the lever and provided with a cutter for engaging the lens, and a link connecting the contact member and tool-holder at one side of their respective pivots.

6. In a machine for cutting lenses, a rotary work-holder, a pattern rotatable about an axis some distance to one side of and parallel with that of the work-holder, a sliding carrier movable transversely of and between the axes of the work-holder and pattern, means for adjusting said carrier endwise, means for rotating the work-holder and pattern in unison, a contact member engaging the periphery of the pattern, a tool-holder having a cutting-tool for engaging the lens, and means mounted on the carrier for supporting the contact member and the tool holder.

7. In a machine for cutting lenses, a rotary work-holder, a pattern rotatable about an axis some distance to one side of and parallel with that of the work-holder, a sliding carrier movable transversely of and between the axes of the work-holder and pattern, means for adjusting said carrier endwise, means for rotating the work-holder and pattern in unison, a contact member engaging the periphery of the pattern, a tool-holder having a cutting-tool for engaging the lens, and means mounted on the carrier for supporting the contact member and the tool holder, said means being adjustable lengthwise of the axes of the work-holder and pattern for effecting a corresponding adjustment of the contact member and tool-holder.

8. In a lens-cutting machine, a rotary lens-holder, a pattern rotatable about an axis parallel with and some distance to one side of the axis of the lens-holder, and provided with a plurality of distinctive zones arranged in sequence axially, a tool-holder having a cutting tool for engaging the lens, a support for the tool-holder movable about an axis parallel with the axis of the lens-holder, a contact member mounted on said support for engaging any one of said zones, and an indexing device for adjusting the pattern axially to register the different zones with the contact member.

9. In a lens-cutting machine, a rotary lens-holder, a pattern rotatable about an axis parallel with and some distance to one side of the axis of the lens-holder and provided with a plurality of distinctive zones arranged in sequence axially thereof, means for rotating the lens-holder and pattern in unison, a lever, a sliding carriage for the lever, a contact member mounted on the lever for engaging any one of said zones, a tool-holder mounted on the lever and provided with a cutting tool for engaging the lens, means including a hand lever for shifting the pattern axially to present its different zones to the contact member, and means for holding the hand lever in different positions of adjustment.

10. In a machine for cutting lenses and analogous work, a rotary work-supporting member, a pattern member rotatable about an axis parallel with and some distance to one side of the axis of the work-holder and having zones of different contours, means for rotating the work-supporting member and pattern in unison, a lever, means pivotally mounting said lever, a rider on the lever engaging the pattern member, a tool holder on the lever for engaging the tool with the work, and means for adjusting the pattern member to present different zones to the rider.

11. In a machine for cutting lenses and analogous work, a rotary work-supporting member, a pattern member rotatable about an axis parallel with and some distance to one side of the work-holder and having zones of different contours, means for rotating the work-supporting member and pattern in unison, a lever, means pivotally mounting said lever, a rider pivotally mounted upon the lever and engaging the pattern member, a tool-holder journaled on the lever for relative rocking movement for engaging the tool with the work, means for adjusting the pattern member to present different zones to the rider, and a link pivotally connected to the rider and to the tool-holder at one side of their respective axes of movement.

12. A machine for cutting lenses and analogous work as in claim 2 in which the rider and the tool holder are pivoted to the lever to turn relatively thereto and are connected by a link at one side of their turning axes.

13. A machine for cutting lenses and analogous work as in claim 2 in which means is provided for adjusting the tool-supporting end of the lever transversely of the axis of the work-supporting member.

14. In a machine for cutting lenses and analogous work, a rotary work-supporting member, a rotary pattern member, means for simultaneously rotating said members, a carrier adjustable transversely of the axis of rotation of the work holder, a lever pivotally mounted on the carrier to rock about an axis parallel with that of the pattern member, a rider pivoted on the lever for engaging the pattern member, a tool-holder also pivoted on the lever adjacent the work-supporting member, and means for adjusting said carrier.

15. In a machine for cutting lenses and analogous work, a rotary work-supporting member, a rotary pattern member, means for simultaneously rotating said members, a carrier adjustable transversely of the axis of rotation of the work holder, a lever pivotally mounted on the carrier to rock about an axis parallel with that of the pattern member, a rider pivoted on the lever for engaging the pattern member, a tool-holder also pivoted on the lever adjacent the work-supporting member, means for adjusting said carrier, said rider and tool-holder being turnable upon the lever, and a link connecting said rider to the tool holder to cause those parts to turn in unison.

In witness whereof I have hereunto set my hand this 28th day of February, 1923.

ELI MAYNARD LONG.